Jan. 21, 1969  A. SCHMIDT  3,422,526

METHOD OF MAKING A BALL JOINT HOUSING

Original Filed Sept. 19, 1963

INVENTOR.
Andreas Schmidt
BY

United States Patent Office 3,422,526
Patented Jan. 21, 1969

3,422,526
METHOD OF MAKING A BALL
JOINT HOUSING
Andreas Schmidt, Osterath-Bovert, Germany, assignor to
A. Ehrenreich & Cie, Dusseldorf-Oberkassel, Germany
Original application Sept. 19, 1963, Ser. No. 310,101, now
Patent No. 3,284,115, dated Nov. 8, 1966. Divided and
this application June 23, 1966, Ser. No. 559,853
Claims priority, application Germany, Sept. 27, 1962,
E 23,598
U.S. Cl. 29—441       2 Claims
Int. Cl. B23p 11/00

The present invention is a divisional application of my copending application Ser. No. 310,101 Sept. 19, 1963, now Patent No. 3,284,115 and entitled, Ball Joint Housing.

The present invention relates to a method of providing a ball joint housing with annular means for resting a sealing bellows thereon. A ball joint housing of the type involved has a passage for the ball stud surrounded by an annular bead for connecting a sealing bellows. Such sealing bellows is connected to the ball joint housing by means of a wire, a clamping ring, or the like, whereby the bead will prevent the bellows from slipping off the housing.

Such annular body, however, will when forged parts are involved, make it necessary that the blank from which the housing is prepared will have to have a larger blank diameter and will also require an additional operation. If, on the other hand, the ball joint housing consists of drawn sheet metal, the manufacture of said annular bead encounters considerable difficulties.

It is, therefore, an object of the present invention to provide a method of making a ball joint housing with an annular bead, which will overcome the above mentioned drawbacks.

It is another object of this invention to provide a method as set forth in the preceding paragraph, which will greatly facilitate the manufacture of ball joint housings of the above mentioned type while considerably reducing the cost thereof These and other objects and advantages of the invention will appear more clearly from the following specification in connection with the accompanying drawing, in which.

Figure 1:
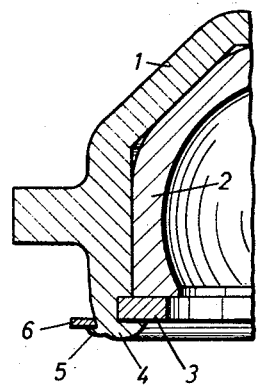
FIG. 1 is a section through a forged ball joint housing portion in which the annular bead or ring is in one operation together with the flanging-in of the lid flanged onto the housing.

More specifically, FIG. 1 shows in section a forged ball joint housing 1 having arranged therein a ball cup 2 held in its position by a closure lid 3 rolled thereinto. For the sake of simplicity, the ball joint stud has been omitted. The closure lid 3 is held in its position by the folded over or rolled over edge 4. Simultaneously with the production of the rolled over edge 4, a slight outwardly extending fin 5 was created which secures a ring 6 previously slipped over housing 1, to the latter. Such ring 6, which may, for instance be stamped of sheet metal or may be butt-welded of steel wire, can be produced inexpensively and can be mounted in a rather simple manner.

Figure 2:
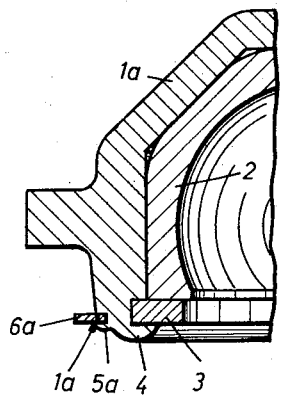
FIG. 2 shows a section through a ball joint housing portion, according to which the flanging-on of the bead or ring is effected in a separate operation.

The arrangement of FIG. 2 differs from that of FIG. 1 primarily in that the housing 1 has a pronounced step 1a, and ring 6a has in a separate operation been flanged against said step by a flanged or rolled over portion 5a.

Figure 3:
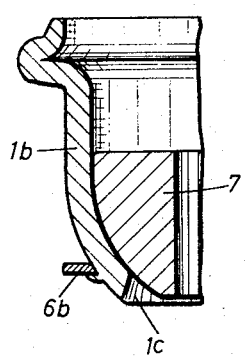
FIG. 3 is a sheet metal housing for a ball joint in which the annular bead or ring is flanged onto the ball-shaped wall surface.

The modification shown in FIG. 3 illustrates a housing 1b drawn of sheet metal. In this arrangement the closure side is located opposite to the passage 1c for the ball joint stud (not shown). The closure lid is likewise not shown in FIG. 3. The ball stud is in a manner known per se not integrally connected to the ball portion 7. Ring 6b is slipped onto housing 1b and flanged thereonto.

Figure 4:
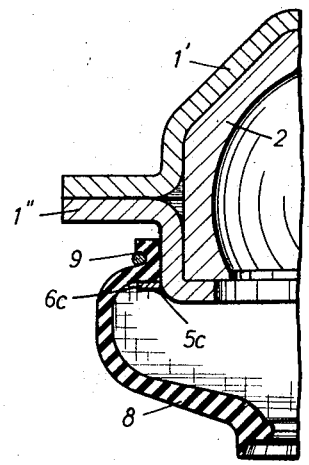
FIG. 4 represents a section through a sheet metal ball joint housing with a cylindrical wall surface.

Finally, with regard to the embodiment illustrated in FIG. 4, the housing is composed of two sheet metal sections 1' and 1". In order to produce the annular bead which surrounds the passage for the ball stud, ring 6c is slipped onto the housing portion 1" and is held thereon in the manner described above by a fin 5c similar to the fins 5 and 5a of FIGS. 1 and 2.

For indicating the mounting of the seal, FIG. 4 shows a bellows 8 which is held on the housing portion 1" behind ring 6c by means of a clamping ring 9.

It is, of course, to be understood that the present invention is, by no means, limited to the particular method set-forth above, but also comprises any modifications within the scope of the appended claims.

What I claim is:
1. In a method of providing a ball joint housing with a sealing bellows and with annular means for resting a sealing bellows thereon, which includes the steps of: producing annular means in the form of a ring member separate from said housing, fitting said ring member on a portion of said housing near said opening, folding portions of said housing near said ring member against the latter so as to flange-in said ring member and firmly connecting said ring member to said housing, and securing said sealing bellows to said housing and against said sealing member

2. In a method of producing a ball joint, the steps of: producing a housing member having an opening for passing a ball stud therethrough, inserting a ball cup and ball stud into said housing, inserting a holding ring into said housing adjacent said ball cup for holding the latter in said housing, producing a ring member separate from said housing, fitting said ring member on an outer surface portion of said housing near said opening, and in one operation folding portions of said housing near said ring member and said holding ring over toward the latter and said ring member to firmly connect said ring member and said holding ring to said housing.

References Cited
UNITED STATES PATENTS

| 2,699,366 | 1/1955 | Heinrich. |
| 2,814,539 | 11/1957 | Borger. |
| 2,885,248 | 5/1959 | White. |
| 2,971,787 | 2/1961 | Lincoln. |
| 3,039,787 | 6/1962 | Meyer. |
| 3,052,477 | 9/1962 | Parker. |
| 3,021,157 | 2/1962 | Moskovitz. |

CHARLIE T. MOON, Primary Examiner.

U.S. Cl. X.R.
29—511, 512, 520, 522